F. C. HARRIS.
STRUCTURAL COUPLING.
APPLICATION FILED JUNE 3, 1921.
1,404,522. Patented Jan. 24, 1922.
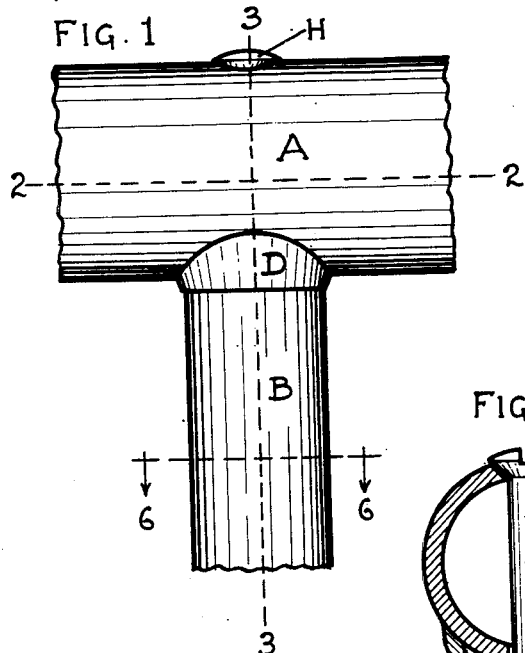
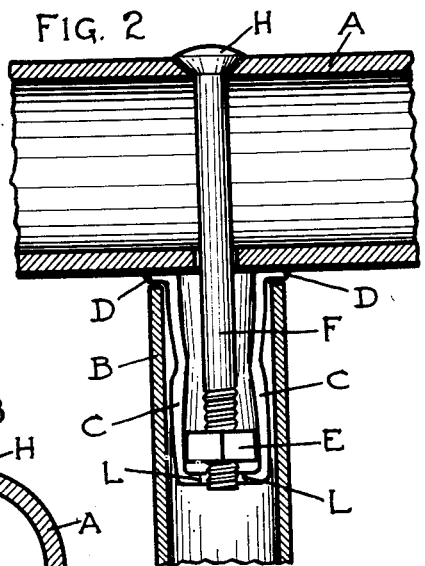
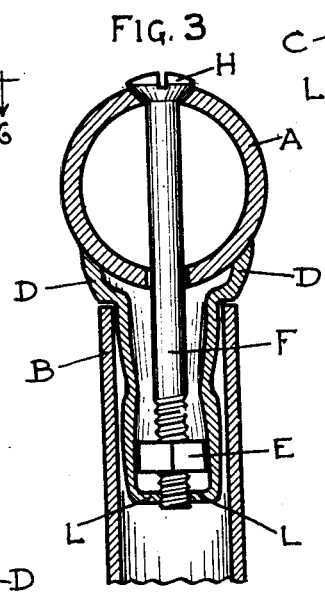
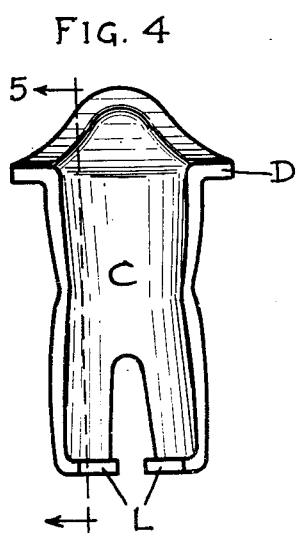
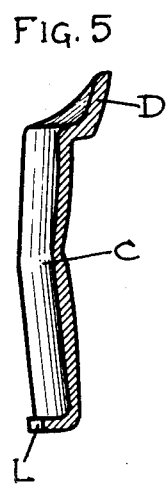
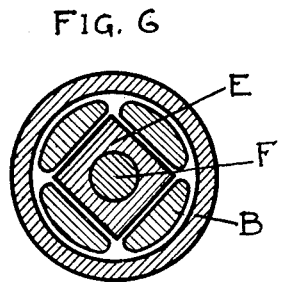
INVENTOR
Frank C. Harris.
BY
William Louden.
ATTORNEY

UNITED STATES PATENT OFFICE.

FRANK C. HARRIS, OF FAIRFIELD, IOWA, ASSIGNOR TO THE LOUDEN MACHINERY COMPANY, OF FAIRFIELD, IOWA, A CORPORATION OF IOWA.

STRUCTURAL COUPLING.

1,404,522.   Specification of Letters Patent.   Patented Jan. 24, 1922.

Application filed June 3, 1921. Serial No. 474,631.

*To all whom it may concern:*

Be it known that I, FRANK C. HARRIS, a citizen of the United States, residing at Fairfield, in the county of Jefferson and State of Iowa, have invented a new and useful Improvement in Structural Couplings, of which the following is a specification.

My invention relates to structural couplings for material suitable for the construction of animal pens and stalls, in which a number of spaced apart members having their ends abutting the side of a frame member are generally used, and for other purposes in which one end of a member is to be abutted against the side of another member to which it is to be coupled at substantially right angles thereto, and it consists of a pair of coupling members designed to hold a screw threaded nut between them, which coupling members with nut in place are inserted in the end of the abutting member, and a threaded bolt or screw is passed through an appropriately placed hole or holes in the other member, and is then passed in between the coupling members where the threaded end of the bolt by connecting with the threaded interior of the nut, will spread the coupling members apart and will draw the members to be coupled firmly together. Also, of other improved feature which will be set forth in the specification and claims.

In the accompanying drawings forming a part of this specification, Fig. 1 is a side elevation embodying my invention and showing the members coupled together. Fig. 2 is a vertically disposed longitudinal section through the center line 2—2 of Fig. 1. Fig. 3 is a vertically disposed transverse section on line 3—3 of Fig. 1. Fig. 4 is an enlarged view of the interior side of one of the coupling members. Fig. 5 is a vertical section on line 5—5 of Fig. 4. Fig. 6 is an enlarged transverse section on line 6—6 of Fig. 1.

Referring to the drawings, A represents a horizontally disposed, and B a vertically disposed, section of tubing, standing at substantially right angles to each other, and having one end of the vertical section abutting the side of the horizontal member. A pair of coupling members represented by C provided with outstanding flanges D to embrace the adjacent side of the member A, is inserted in the end of the member B. Before inserting the members C a screw threaded nut E is placed between their lower ends and this nut will be held in this position by means of the inwardly extending lugs L on the lower ends of the members.

The member A which has appropriately located holes drilled in its opposite walls, is placed in position, as shown by the drawings. A bolt or screw F, having threads on its lower end, to correspond with the threads in the nut E, is passed through the holes in the member A, and then in between the members C to the nut E. The lower interior portions of the members C are made to fit the contour of the nut E which being supported therein by the inwardly projecting lugs L, will be held from turning. The bolt or screw F being turned by a screw driver or wrench applied to its head H will engage the threads of the nut which will be drawn upwards between the members C.

The inner faces of the lower ends of the members C above the lugs L being inwardly and upwardly tapered, as shown in the drawings, and the nut E being drawn away from the lugs L, will cause the members C to spread apart and to become tightly wedged in the member B. At the same time, the flanges D on the upper ends of the members C, will be drawn up against the adjacent side of the member A, which will also cause the upper ends of the members C to spread apart and to become tightly wedged in the upper end of the member B, whereby the members A and B will be securely joined together.

The member B must either be tubular or hollow to a certain extent to receive the coupling members C, and it is preferable that the member A should also be tubular as shown in the drawings, but if desired it may be of solid material and have a single hole for the passage of the bolt F. In that event, the flanges D should be designed to suit the contour of the material used, and the bolt F will have to be the proper length to pass through the hole in the member A, and through between the coupling members C, so as to connect with the nut E, and thus couple the members A and B together.

The head H of the bolt or screw F is preferably made round with a slot as shown in Fig. 3, in which case a screw driver will be used to turn it and tighten it in the nut E.

The upper hole in the member A is preferably countersunk so the head of the bolt can be drawn in almost level with its outer surface, and the flanges D, being the only other outside portions of the coupling members, an exceedingly neat and smooth structure will be produced. If preferred, however, the head of the bolt may be made square or hexagon in which case a wrench may be used to tighten the bolt.

The coupling is extremely simple and inexpensive. No springing of any of the parts nor crimping or other manipulation of the members to be coupled is required. All that is necessary is the drilling of the hole or holes in the member A, to admit the bolt F. In effect my invention is practically an internal coupling, the coupling portions on the exterior being so small and so inobtrusive that they are hardly noticeable. In addition to being neat and smooth, the members will also be firmly and securely held together and may be readily taken apart by loosening the bolt F.

The coupling is also readily and easily put together. All that is needed is to place the nut E between the lower ends of the members C; insert them in the end of the member B; set the member A in position; insert the bolt F in the hole or holes therein; then pass the bolt between the members C until its threaded end comes in contact with the nut E, and then turn the bolt from the outer end to engage the threads in the nut and to tighten it in the nut. In the construction of animal pens a plurality of the members B will be used with a member A connected to one or both of their several ends. To distinguish them the member A should be called the main member and the member B the abutting member.

What I claim is:

1. In structural couplings, a pair of members to be coupled together positioned so an end of one member will abut the side of the other member, there being a longitudinal opening in the body of the abutting member, and a transverse hole or holes in the body of the main member, said hole or holes being placed opposite the aforesaid opening; a pair of coupling members having tapered interiors inserted in said opening of the abutting member, a threaded nut inserted between said coupling members; a bolt having a threaded end inserted in the transverse hole or holes in the main member, and then passed between the coupling members, whereby the threaded end of the bolt will be brought in contact with the threads of the nut and by turning the bolt in the main member will tighten it in the nut, the coupling members will be spread apart and will become tightly wedged in the abutting member, and the main member will be securely held by the bolt passed therethrough, and connected to the nut between the coupling members.

2. In structural couplings, a pair of members to be coupled together positioned so an end of one member will abut the side of the other member, the abutting member being of tubular construction, and the main member having a transverse hole or holes in its body; a pair of coupling members having tapered interiors inserted in the abutting member; a threaded nut inserted between said coupling members; a bolt having a threaded end inserted in the transverse hole or holes in the main member, and then passed between the coupling members, whereby the threaded end of the bolt will be brought into contact with the threads of the nut and by turning the bolt in the main member will tighten it in the nut, the coupling members will be spread apart, and become tightly wedged in the abutting member, and the main member will be securely held by the bolt passed therethrough and connected to the nut between the coupling members.

3. In structural couplings, a pair of tubular members to be coupled together, consisting of a main member having a corresponding hole in each of its walls, and the other member having one of its ends abutting the side of the main member opposite the holes therein; a pair of coupling members having tapered interiors and inwardly extended lugs on their lower ends; a threaded nut inserted between the coupling members above the inwardly extended lugs, and held in position by said lugs, said coupling members with nut therein being inserted in the end of the abutting member, and a bolt with threaded end inserted in the holes in the walls of the main member and passed between the coupling members in the abutting member, whereby the threaded end of the bolt will come in contact with the threaded nut held therein, and by turning the bolt to tighten it in the nut, the coupling members will be spread apart and become tightly wedged in the abutting member, whereby the members will be securely coupled together.

4. In structural couplings, a pair of tubular members to be coupled together, consisting of a main member having a corresponding hole in each of its walls, and the other member having one of its ends abutting the side of the main member opposite the holes therein; a pair of coupling members having tapered interiors and with inwardly extended lugs on their lower ends, and outwardly extended flanges on their upper ends; a threaded nut inserted between the lower ends of the coupling members and held in position by said inwardly extended lugs, said coupling members with nut therein being inserted in the end of the abutting member, and a bolt with threaded end inserted in the holes in the walls of the main member, and passed between the coupling members in the abutting member, whereby the threaded end of the bolt will come in contact with the threaded nut held therein, and by turning the bolt to tighten it in the nut, the coupling members will be spread apart by the sliding of the nut on the tapered interiors of the coupling members, and by the outwardly extended flanges on their upper ends coming in contact with the adjacent sides of the main member, and the members will thereby be securely coupled together.

Fairfield, Iowa, June 1st, 1921.

FRANK C. HARRIS.